United States Patent [19]

Gregg

[11] Patent Number: 4,553,577
[45] Date of Patent: Nov. 19, 1985

[54] WHEEL STRUCTURE WITH RESILIENT SPOKES

[76] Inventor: John D. W. Gregg, Tobarcooran House, Glebe West, Newtownabbey, Northern Ireland

[21] Appl. No.: 609,865

[22] Filed: May 14, 1984

Related U.S. Application Data

[63] Continuation of Ser. No. 319,394, Nov. 9, 1981, abandoned.

[30] Foreign Application Priority Data

Nov. 10, 1980 [GB] United Kingdom ............... 8036070

[51] Int. Cl.[4] .............................................. B60B 9/26
[52] U.S. Cl. ..................................... 152/12; 152/80; 152/323
[58] Field of Search ................... 152/7, 12, 40, 69, 70, 152/75, 79, 323, 17, 18, 11, 258–260, 275, 280, 282, 278, 80, 85, 86

[56] References Cited

U.S. PATENT DOCUMENTS

| | | | |
|---|---|---|---|
| 1,017,236 | 2/1912 | Tvinde | 152/85 |
| 1,071,314 | 8/1913 | Hardin | 152/69 |
| 1,286,369 | 12/1918 | McConet | 152/12 |
| 1,349,019 | 8/1920 | Timberlake | 152/80 |
| 2,377,531 | 6/1945 | Waters | 152/69 |

FOREIGN PATENT DOCUMENTS

1292928 10/1972 United Kingdom .

Primary Examiner—H. Grant Skaggs
Attorney, Agent, or Firm—Sandler & Greenblum

[57] ABSTRACT

A wheel structure having a rim and a hub interconnected by spokes with a longer portion and a shorter portion meeting at an angle or direction change region at locations all of which lie on a notional circle closer to the hub than to the rim. Preferably, the rim locations lie, in each case, beyond that radius including the spoke-hub origin point. Spurs can be provided at these locations, generally as extensions of the longer portion, to protrude into the back of the next location around the circle and thereby limit the distortion under load.

17 Claims, 4 Drawing Figures

WHEEL STRUCTURE WITH RESILIENT SPOKES

This is a continuation of application Ser. No. 319,394 filed Nov. 9, 1981 and now abandoned.

BACKGROUND OF THE INVENTION

1. Field of the Invention

This invention relates to internally sprung wheels, that is to say, of the type in which a suspension is provided between the hub and a continuous rim.

2. Discussion of Prior Art

Great Britain Pat. No. 1 292 928, published Oct. 18, 1972 shows an example of this type of wheel. It describes an integral wheel structure of synthetic polymeric material having a continuous rim and a hub, interconnected by equispaced identical spoke members shaped to provide resilient support. Each spoke is arcuate, and exhibits a longer portion located towards the hub and a shorter portion located towards the rim. These portions extend in generally different directions so that flexure takes place across the significant change of curvature displayed where they meet.

The present invention sets out to provide a modified and improved form of such a wheel.

SUMMARY OF THE INVENTION

The present invention consists of a wheel structure of integral synthetic polymer material having a continuous rim and a hub, interconnected by equispaced identical spokes shaped to provide resilient support, in which each spoke exhibits a shorter portion towards its hub end and a longer portion towards its rim end, the portions extending in generally different directions whereby flexure takes place across the angle or significant changes of curvature displayed at the location where the two portions meet, the said location being radially closer to the hub than to the rim.

Preferably, each spoke is shaped so that the shorter portion commences at a hub origin point and extends non-radially to one side of the radius including that hub origin point, and the longer portion commences at a rim origin point and extends non-radially across that radius including the hub origin point to meet the shorter portion.

Thus, in this preferred form of the invention the rim origin point is not on the same radius as the hub origin point.

In that all of the spokes are identical and equally spaced, it will be appreciated that the locations at which the longer and shorter portions meet are arranged in a notional circle spaced from the hub. Preferably, each such location lies beyond the radius including the rim origin point of the next spoke. Even more preferably, it lies past the line joining such next rim origin point and the corresponding next hub origin point. It can even be beyond the radius which includes this hub origin point of the next spoke. Thus, the totality of the spokes exhibit in a preferred embodiment a succession of asymmetrical, but generally V-shaped, members with a shorter limb of the V attached to the hub and a longer limb of the V attached to the rim.

The two portions of the spokes can be straight or arcuate. If arcuate, they are preferably arcuate in the same sense, e.g. so as to be convex outwards (towards the rim). Such arcuate spokes can be shaped as arcs of a circle.

The number of spokes in the wheel structure can vary over a reasonable range, but generally from 4 to 24 spokes are present, preferably from 6 to 25. Wheels containing 6, 8 or 12 spokes are particularly preferred.

When the number of spokes and the degree of displacement (of the meeting location between the longer and shorter portions towards the next spoke) is otherwise suitable an additional preferred feature of the invention is to provide an integral or attached spur or extension originating from the said meeting location and extending towards the inner portion of the meeting location on the next spoke. The purpose of this spur or extension is to provide a mechanical stop against excessive distortion of the wheel under load.

The extent and shape of distortion of the wheel under load is complex and depends not only upon the material of construction but also upon the geometry of the wheel. The relative lengths of the two portions of the spokes and the relative magnitude of the hub and rim radius affect the wheel behaviour. It is envisaged that the ratio between the hub radius and the rim radius can vary from 1:20 to 1:2. More preferably the ratio varies from 1:10 to 1:3. The location at which the longer and shorter portions of each spoke meet is, according to the invention, closer to the hub than to the rim; preferably, it is from one-fifth to one-half of this separation distance, measured radially outward from the hub, and most preferably from one-third to one quarter of this distance.

The ratio of the length of the longer portion of the spoke to the shorter portion can also vary within the scope of the invention. Preferably, it is from 2:1 to 10:1. Most preferably it is from 3:1 to 5:1.

Absolute sizes of the wheel structure according to the invention again depend upon the geometry and material of construction. Conveniently, the wheel can be from 5 cms to 30 cms in diameter. The hub diameter can be from 1 cm to 10 cms. The spokes can be from 2 mm to 2 cm thick, i.e. measured transverse to their length.

It is preferable for the wheel itself to be relatively thick, measured in this case along the axis of rotation. Such a thickness is preferably from one-tenth to one-third of the rim diameter, since an unduly thin wheel can have a tendency to twist when placed under pressure unless additional strengthening means are supplied.

The rim itself can distort and the spokes can distort in different ways depending their momentary orientation in relation to the force on the axle. However, although the theoretical nature of such distortion has not yet been fully worked out, we have observed that the distortion of the wheel is different from the distortions achieved using the wheel structure described in British Pat. No. 1 292 928, and that in particular (other characteristics being similar) a generally stiffer wheel is obtained according to the present invention.

BRIEF DESCRIPTION OF THE DRAWINGS

The invention will be further described with reference to the accompanying drawings in which.

DETAILED DESCRIPTION OF THE INVENTION

Figure 1:
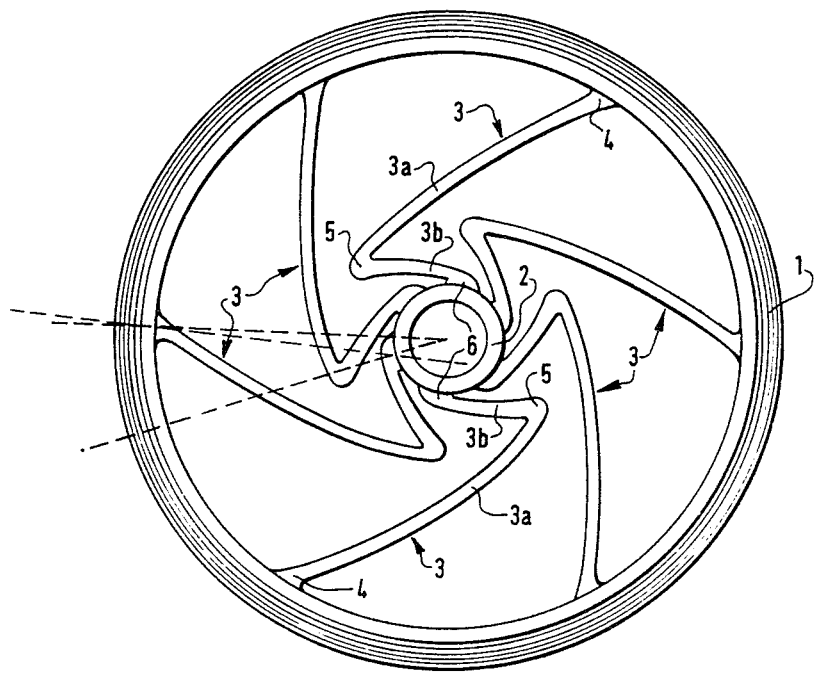
FIG. 1 shows a first embodiment of wheel according to the invention.

In FIG. 1, the wheel possesses a continuous rim 1, a hub 2 and spokes 3 all integrally molded in a suitable resilient synthetic polymeric material such as polyvinylchloride or a polyolefin or a polyamide.

By way of example the hub 2 is a cylindrical member of a wall thickness of 3 mm, the rim has a thickness of approximately 1 cm, and the spokes 3 have a thickness of approximately 3 mm in their longer portions 3a and 2 mm in their shorter portions 3b. The thickness of the wheel (measured along the rotation axis i.e. at right angles to the plane of the drawing) is greater at the hub than at the rim, and varies from 4 cm to $2\frac{1}{2}$ cm, one side of the wheel projecting somewhat beyond the plane of the rim.

Figure 2:
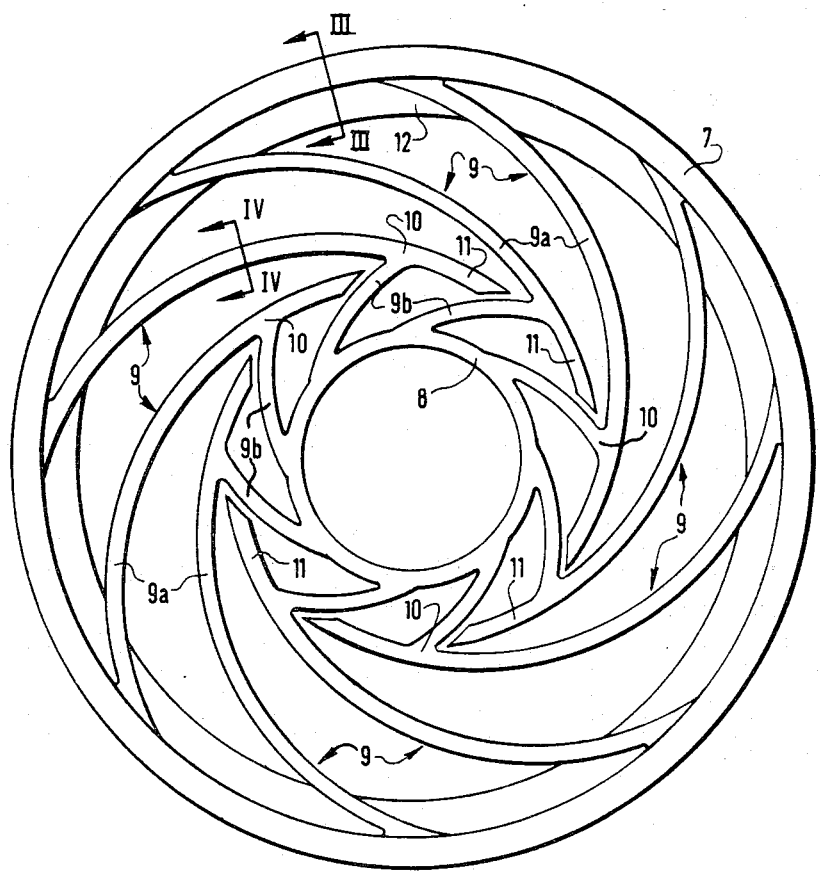
FIG. 2 shows a second embodiment of wheel according to the invention.

There are six identical spokes 3 equispaced around the wheel. Each spoke 3 extends from a rim origin point 4 at the inner periphery of the rim 1, inwards as a longer portion 3a to meet at location 5 the shorter portion 3b which in turn meets the hub at a hub origin point 6. Thus, as shown, the meeting location 5 of a given spoke is to one side of the radius including its hub origin point 6, and the rim origin point is on the other side of this radius. As illustrated in FIG. 1, the length of longer portion 3a is greater than the hub-to-rim radial distance of the wheel. In practice, the shorter portion 3b at its hub origin point 6 is slightly turned towards the hub for ease of molding. The portions 3a and 3b are each arcs of a circle and their meeting location 5 is smoothly externally rounded. However, as illustrated in FIGS. 1 and 2, meeting location 5 defines an acute angle. It will be clear from FIG. 1 that the six meeting locations 5 are themselves arranged in a circle, and are closer to the hub 2 than to the rim 1.

The relationship of each meeting location 5 to the neighboring spoke is also significant. A notional radius including rim origin point 4 cuts across the adjacent spoke so that the meeting location 5 of that adjacent spoke lies on a different side of such a radius from the bulk of the adjacent spoke. Similarly, if rim origin point 4 and hub origin point 6 are joined the meeting locations of the adjacent spoke still lies on the other side of such a joining line from the bulk of its structure. In the embodiments shown, the radius including the hub origin point 6 passes through the meeting location 5 of an adjacent spoke, but if desired this adjacent spoke could be even more displaced towards the inside of the distorted V-shaped of its neighbor.

FIG. 2 shows a wheel with a rim 7, a hub 8, and a plurality of spokes 9. Again, each spoke has a longer portion 9a and a shorter portion 9b arranged so that these portions meet at a location 10 closer to the hub than to the rim. The general arrangement is thus similar to that shown in FIG. 1. In FIG. 2 because there are a higher number of spokes, the meeting location 10 of any given spoke is well over the radius containing the rim origin point of its neighbor, also well over the line joining the rim origin point and hub origin point of its neighbor, and again about on the same radius as that containing the hub origin point of its neighbor.

An additional feature in this embodiment is shown by the provision of spurs or extensions 11. The purpose of these spurs or extensions is to prevent undue distortion leading to breakage or damage. If the hub 9 is displaced towards the rim 8 there comes a point when the spurs 11 meet the inside of the V-shape of an adjacent spoke and prevent further compression. The spurs can be of any predetermined length to give any predetermined extent of flexibility prior to such arrest.

Figure 3:
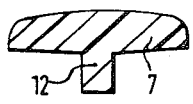
FIG. 3 shows a section along line III—III of FIG. 2.

FIG. 3 shows a cross-section of the rim along line III—III of FIG. 2, indicating an internally peripheral strengthening rim 12.

Figure 4:
FIG. 4 shows a section along the line IV—IV of FIG. 2.

FIG. 4 shows a transverse cross-section through a spoke 9 along line 4—4 of FIG. 2. Although not shown in FIG. 2, it will be apparent from the exaggerated drawing shown in FIG. 4 that the spokes are preferably somewhat thicker along their median line than they are at each face of the wheel. A comparison of FIGS. 3 and 4 shows that the cross-sectional axial width of each spoke 9 is comparable to the axial cross-sectional width of rim 7.

I claim:

1. A wheel structure of integral synthetic polymer material comprising: a continuous rim; a hub; and a plurality of equispaced identical spokes interconnecting said rim and said hub; each of said spokes possessing a shorter portion integrally connected to the hub at a hub origin point and a longer portion integrally connected to said rim at a rim origin point, said shorter and longer portions of a spoke extending in generally different directions and being integrally connected at a meeting location that is radially closer to said hub than to said rim whereby flexure takes place around said meeting location to support resiliently a load applied to said wheel and wherein said meeting location defines an acute angle, and each of said spokes further comprising an extension to said longer portion originating from said meeting location and extending towards the meeting location of the next spoke to provide a mechanical stop against excessive distortion.

2. The wheel structure as claimed in claim 1 in which said shorter portion of each of said spokes commences at a hub origin point and extends non-radially to one side of the radius that includes said last mentioned hub origin point, and said longer portion of each of said spokes commences at a rim origin point and extends non-radially across said radius to the meeting location between said longer and said shorter portion.

3. The wheel structure as claimed in claim 2 in which the meeting locations between said shorter portion of each of said spokes and said longer portion thereof are such that both portions intersect a radius passing through a rim origin point of an adjacent spoke.

4. The wheel structure as claimed in claim 2 in which the meeting locations between said shorter portion of each of said spokes and said longer portion thereof are such that both portions intersect a line joining a rim origin point and a hub origin point of an adjacent spoke.

5. The wheel structure as claimed in claim 2 in which the meeting locations between said shorter portion of each of said spokes and said longer portion thereof are such that both portions intersect a radius including a hub origin point of an adjacent spoke.

6. The wheel structure as claimed in claim 1 in which each portion of each of said spokes is arcuate and has a convex surface facing said rim.

7. The wheel structure as claimed in claim 1 having from 6 to 15 spokes.

8. A wheel structure according to claim 1 wherein the length of the said longer portion of each spoke is greater than the hub-to-rim radial distance.

9. The wheel according to claim 1 wherein the cross-sectional axial width of each of said spokes is comparable to the axial cross-sectional width of said rim.

10. The wheel structure as claimed in claim 1 wherein the ratio between the hub radius and rim radius is from 1:20 to 1:2; the ratio of the length of said longer portion to said smaller portion is from 2:1 to 10:1; and said meeting location of each of said spoke is at from one-fifth to one-half of the separation distance between said hub and said rim, measured radially outwards from said hub.

11. The wheel structure as claimed in claim 1 wherein said wheel is from 5 to 30 cms in diameter, said hub is from 1 to 10 cms in diameter, said spokes are from 2 mm to 2 cm thick, and the wheel thickness measured parallel to the rotation axis is from one-tenth to one-third of the rim diameter.

12. A wheel structure of integral synthetic polymer material comprising: a continuous rim integrally connected to a hub by a plurality of equispaced identical spokes, each of said spokes inculding a shorter portion connected to said hub at a hub origin point and a longer portion connected to said rim at a rim origin point, said portions of each spoke extending from their respective origin points in generally different directions and meeting at a meeting location that is radially closer to said hub than to said rim, whereby flexure takes place around said meeting location to resiliently support a load applied to said wheel structure, each of said spokes further comprising an extension to said longer portion originating at said meeting location and extending towards the meeting location of the next spoke to provide a mechanical stop against distortion.

13. The wheel according to claim 12 in which said shorter portion of each of said spokes commences at a hub origin point and extends non-radially to one side of the radius that includes said last mentioned hub origin point, and said longer portion of each of said spokes commences at a rim origin point and extends non-radially across said radius to the meeting location between said longer and said shorter portion.

14. The wheel structure as claimed in claim 13 in which the meeting locations between said shorter portion of each of said spokes and said longer portion thereof are such that both portions intersect a radius passing through a rim origin point of an adjacent spoke.

15. The wheel structure as claimed in claim 13 in which the meeting locations between said shorter portion of each of said spokes and said longer portion thereof are such that both portions intersect a line joining a rim origin point and a hub origin point of an adjacent spoke.

16. The wheel structure as claimed in claim 13 in which the meeting locations between said shorter portion of each of said spokes and said longer portion thereof are such that both portions intersect a radius including a hub origin point of an adjacent spoke.

17. The wheel structure as claimed in claim 12 in which each portion of each of said spokes is arcuate and has a convex surface facing said rim.

* * * * *